United States Patent
Iwamoto et al.

(10) Patent No.: US 7,220,214 B2
(45) Date of Patent: May 22, 2007

(54) SHIFT CONTROL SYSTEM FOR AUTOMATIC TRANSMISSION

(75) Inventors: Ikuhiro Iwamoto, Aichi (JP); Katsutoshi Usuki, Aichi (JP); Masahiro Hamano, Aichi (JP); Yoichi Furuichi, Aichi (JP)

(73) Assignee: JATCO Ltd, Fuji-shi (JP)

( * ) Notice: Subject to any disclaimer, the term of this patent is extended or adjusted under 35 U.S.C. 154(b) by 262 days.

(21) Appl. No.: 11/078,417

(22) Filed: Mar. 14, 2005

(65) Prior Publication Data

US 2005/0221948 A1    Oct. 6, 2005

(30) Foreign Application Priority Data

Mar. 26, 2004    (JP)    ............... 2004-091752

(51) Int. Cl.
*F16H 59/00*    (2006.01)
(52) U.S. Cl. .................. 477/98; 477/117; 477/151; 477/156; 701/56
(58) Field of Classification Search .............. 477/98, 477/115, 117, 151, 156; 701/55, 56, 67
See application file for complete search history.

(56) References Cited

U.S. PATENT DOCUMENTS

| 5,743,826 | A | * | 4/1998 | Usuki et al. ................. 477/98 |
| 5,960,669 | A | * | 10/1999 | Ohashi et al. ................ 74/335 |
| 6,584,394 | B2 | * | 6/2003 | Takatori et al. .............. 701/55 |
| 6,790,160 | B2 | * | 9/2004 | Kato et al. .................. 477/154 |
| 6,915,681 | B2 | * | 7/2005 | Kaigawa et al. .......... 73/118.1 |

FOREIGN PATENT DOCUMENTS

JP    8-166058 A    6/1996

* cited by examiner

*Primary Examiner*—David D. Le
(74) *Attorney, Agent, or Firm*—Foley & Lardner LLP

(57) ABSTRACT

A shift control system for an automatic transmission. The shift control system includes an oil temperature sensor, a hydraulic controller to operate a hydraulic clutch, and a control unit in operative communication with the oil temperature sensor and the hydraulic controller. When a gear shift is requested just after an engine restart, the control unit controls the hydraulic clutch with an adjusted shift control process, in contrast to a normal condition of the engine. This adjustment is determined based on a first oil temperature at a time point when the engine is last stopped and on a temperature difference between the first oil temperature and a second oil temperature at a time point when the engine is last restarted after the last engine stop.

12 Claims, 9 Drawing Sheets

MAP FOR ADJUSTMENT OF CLUTCH APPROACH PERIOD $T_f$

MAP FOR ADJUSTMENT OF EARLY-STAGE DUTY RATIO $D_A$

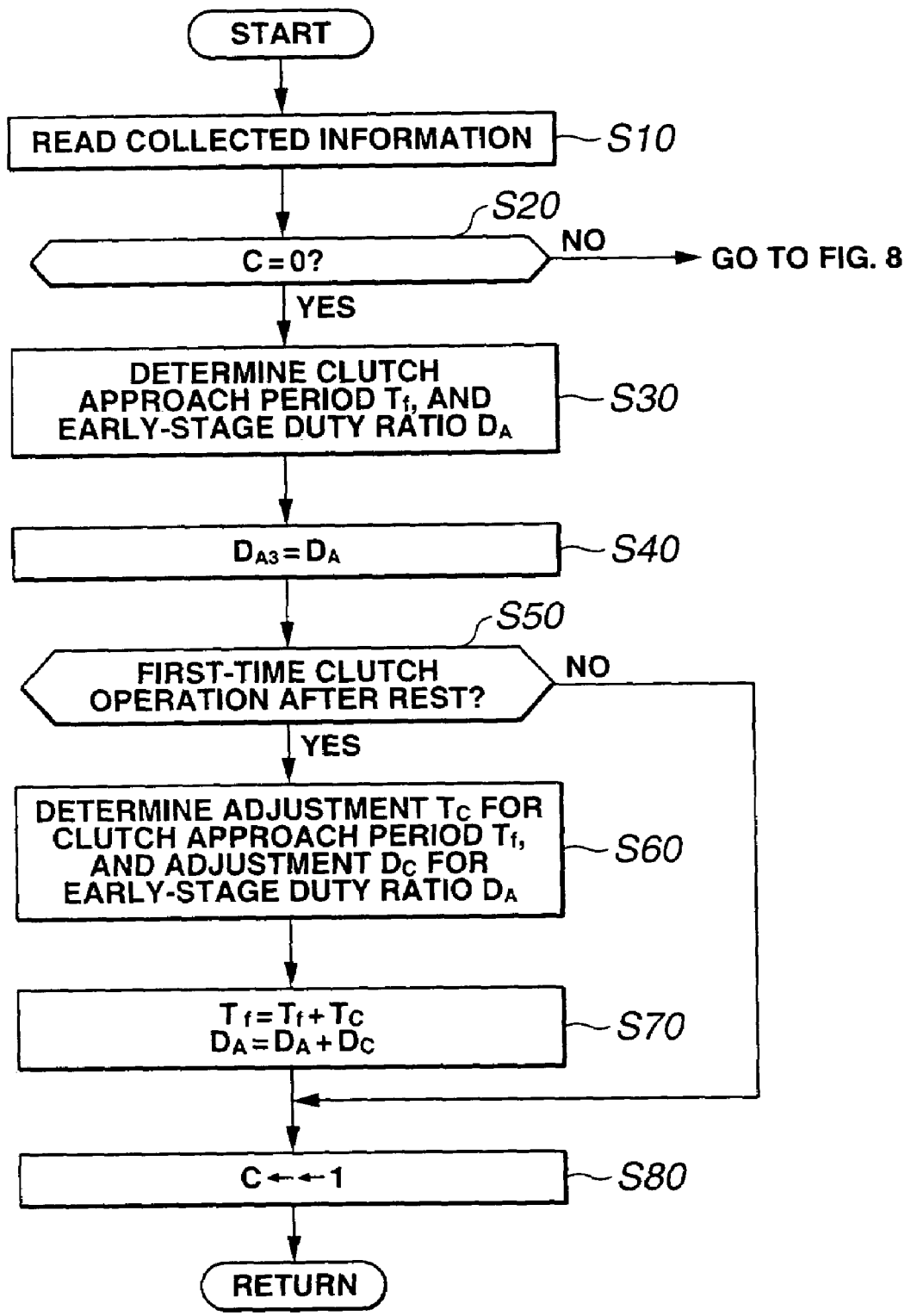

SHIFT CONTROL SYSTEM FOR AUTOMATIC TRANSMISSION

BACKGROUND OF THE INVENTION

The present invention relates generally to shift control systems for automatic transmissions, and more particularly to a shift control system for an automatic transmission, configured to suitably control shift operation requested just after the engine being restarted after a period of rest, so as to reduce a potential shift shock.

In general, leaving an internal combustion engine at rest for some period of time leads to dropping down to an oil pan hydraulic fluid such as lubricating oil with which a hydraulic circuit is filled by an oil pump driven by the engine. This is true for hydraulic fluid in a hydraulic circuit that supplies hydraulic pressure to frictional engaging elements such as a hydraulic clutch and a hydraulic brake in an automatic transmission. When the hydraulic fluid in the frictional engaging elements and in the hydraulic circuit drops down into the oil pan, air enters the frictional engaging elements and the hydraulic circuit. During shift operations just after restarting the engine, the entrance of air results in a delay in engagement of the frictional engaging elements and thereby in a delay in shift response. In addition, this delay tends to increase a shift shock.

A Japanese Laid-open Patent Application No. H8(1996)-166058 shows a technique against such a problem as discussed above. In this technique, first, an engine rest time period $T_{stop}$ is estimated based on an oil temperature at the last engine stop $T_1$, an oil temperature at the restart of the engine $T_2$, and an atmosphere temperature $T_3$. In case engine rest time period $T_{stop}$ is greater than or equal to a predetermined threshold time period $T_{trg}$, it is determined that air enters a hydraulic circuit for supplying hydraulic fluid to a frictional engaging element. In response to the determination, the line pressure and the accumulator back pressure are increasingly adjusted during shift operations in a predetermined number of times just after the engine restart, to avoid the delay in engagement of the frictional engaging elements.

SUMMARY OF THE INVENTION

In general, the quantity of hydraulic fluid dropped in an oil pan depends not only on the time period during the engine is at rest, but also on the oil temperature at the last engine stop. Therefore, it is not always proper to determine that air enters a hydraulic circuit in accordance with the estimation that engine rest time period $T_{stop}$ is greater than or equal to predetermined threshold time period $T_{trg}$. At a low temperature, the viscosity of hydraulic fluid is high, so that the fluidity of hydraulic fluid is low. On the other hand, at a high temperature, the viscosity of hydraulic fluid is low, so that the fluidity of hydraulic fluid is high. Accordingly, the speed of free drop of the hydraulic fluid increases with increasing temperature of the hydraulic fluid. In case the line pressure and the accumulator back pressure are increased for adjustment, the speed of increasing the line pressure and the accumulator back pressure decreases with decreasing temperature of the hydraulic fluid or with increasing viscosity of the hydraulic fluid. Therefore, the simple determination only based on the rest time period is not enough to determine properly whether air enters the hydraulic circuit. This conventional technique does not always decrease a shift shock.

Accordingly, it is an object of the present invention to provide a shift control system for an automatic transmission, configured to control a hydraulic pressure to decrease a shift shock just after restarting an engine after a period of rest based on a proper determination whether air enters a hydraulic circuit including frictional engaging elements of the automatic transmission.

According to one aspect of the present invention, a shift control system for an automatic transmission for a vehicle, the automatic transmission including a frictional engaging element selectively engageable to establish a gear ratio, and a hydraulic pump to supply a hydraulic pressure to engage the frictional engaging element, the shift control system comprises an oil temperature sensor to measure an oil temperature of hydraulic fluid flowing within the automatic transmission, a hydraulic controller to regulate the hydraulic pressure, and a control unit in operative communication with the oil temperature sensor and the hydraulic controller, to perform the following, determining a first oil temperature at a first time point when an engine of the vehicle is last stopped, determining a second oil temperature at a second time point when the engine is last restarted after the first time point, and controlling the hydraulic pressure to engage the frictional engaging element, in accordance with the first oil temperature and a temperature difference between the first oil temperature and the second oil temperature.

According to another aspect of the invention, a shift control system for an automatic transmission for a vehicle, the automatic transmission including a frictional engaging element selectively engageable to establish a gear ratio, and a hydraulic pump to supply a hydraulic pressure to engage the frictional engaging element, the shift control system comprises oil temperature sensing means for measuring an oil temperature of hydraulic fluid flowing within the automatic transmission, hydraulic controlling means for regulating the hydraulic pressure, and control means in operative communication with the oil temperature sensing means and the hydraulic controlling means, for performing the following, determining a first oil temperature at a first time point when an engine of the vehicle is last stopped, determining a second oil temperature at a second time point when the engine is last restarted after the first time point, and controlling the hydraulic pressure to engage the frictional engaging element, in accordance with the first oil temperature and a temperature difference between the first oil temperature and the second oil temperature.

According to a further aspect of the invention, a method of controlling a shift control system for an automatic transmission for a vehicle, the automatic transmission including a frictional engaging element selectively engageable to establish a gear ratio, and a hydraulic pump to supply a hydraulic pressure to engage the frictional engaging element, the method comprises determining a first oil temperature at a first time point when an engine of the vehicle is last stopped, determining a second oil temperature at a second time point when the engine is last restarted after the first time point, and controlling the hydraulic pressure to engage the frictional engaging element, in accordance with the first oil temperature and a temperature difference between the first oil temperature and the second oil temperature.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 7 is a flow chart depicting a first part of an N-to-D shift control subroutine in accordance with the embodiment of the present invention.

DETAILED DESCRIPTION OF THE INVENTION

Figure 1:
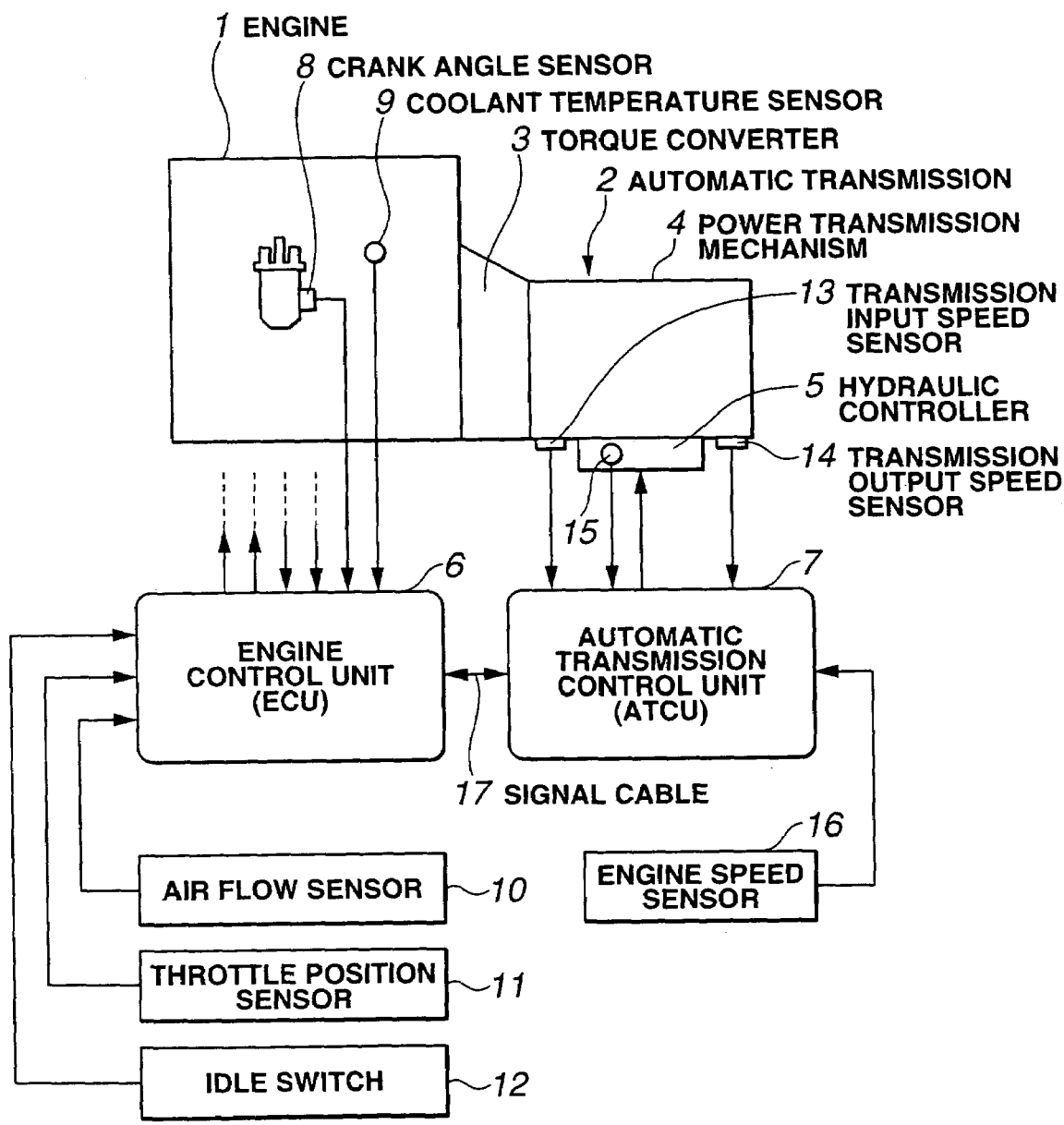
FIG. 1 is a schematic diagram depicting a powertrain including an automatic transmission including a shift control system in accordance with an embodiment of the present invention.

FIG. 1 is a schematic diagram depicting a powertrain for a passenger car, the powertrain including an automatic transmission including a shift control system in accordance with an embodiment of the present invention. As shown in FIG. 1, this powertrain includes an internal combustion gasoline engine 1. Engine 1 is connected at its rear end (on the right side of FIG. 1) to a four-speed automatic transmission 2. Driving torque is transmitted via automatic transmission 2 to driven wheels (not shown).

Automatic transmission 2 includes a torque converter 3, a power transmission mechanism 4, and a hydraulic controller 5. Power transmission mechanism 4 includes a plurality of planetary gearsets, and selectively engageable frictional engaging elements such as a hydraulic clutch and a hydraulic brake. Hydraulic controller 5 includes an integrally-formed hydraulic circuit, and a plurality of solenoid valves for adjusting or regulating hydraulic pressures in the hydraulic circuit.

Engine 1 and automatic transmission 2 are controlled by an engine control unit (ECU) 6 and an automatic transmission control unit (ATCU) 7, respectively. ECU 6 and ATCU 7 each include input/output devices, memories such as ROM, RAM, and BURAM in which multiple control programs and data maps are stored, a central processing unit (CPU), and a time counter (not shown). ECU 6 is connected at its input section to a crank angle sensor 8 for measuring an engine speed Ne of engine 1 and crank angles of cylinders, a coolant temperature sensor 9 for measuring a coolant temperature TW, an air flow sensor 10 for measuring a quantity of intake air, a throttle position sensor 11 for measuring a throttle opening θTH of a throttle valve, an idle switch 12 for detecting a closed state of the throttle valve, and other sensors and switches. On the other hand, ATCU 7 is connected at its input section to a transmission input speed sensor 13 for measuring a rotational speed $N_T$ of a turbine shaft of torque converter 3 (a transmission input speed), a transmission output speed sensor 14 for measuring a rotational speed $N_O$ of a transfer drive gear (a transmission output speed), instead of a vehicle speed V, an oil temperature sensor 15 for measuring an oil temperature of ATF oil flowing within automatic transmission 2, an engine speed sensor 16 for measuring an engine speed Ne based on sensed ignition pulses, and sensors and switches such as an inhibitor switch (not shown).

Connected by a signal cable 17, ECU 6 and ATCU 7 exchange information with each other by serial communication. ECU 6 controls overall operations of engine 1, such as the quantity of fuel injection, and the timing of ignition, based on information input from the sensors and switches. ATCU 7 controls automatic transmission 2 based on information input from the sensors and switches, regulating via hydraulic controller 5 the frictional engaging elements in power transmission mechanism 4.

Figure 2:
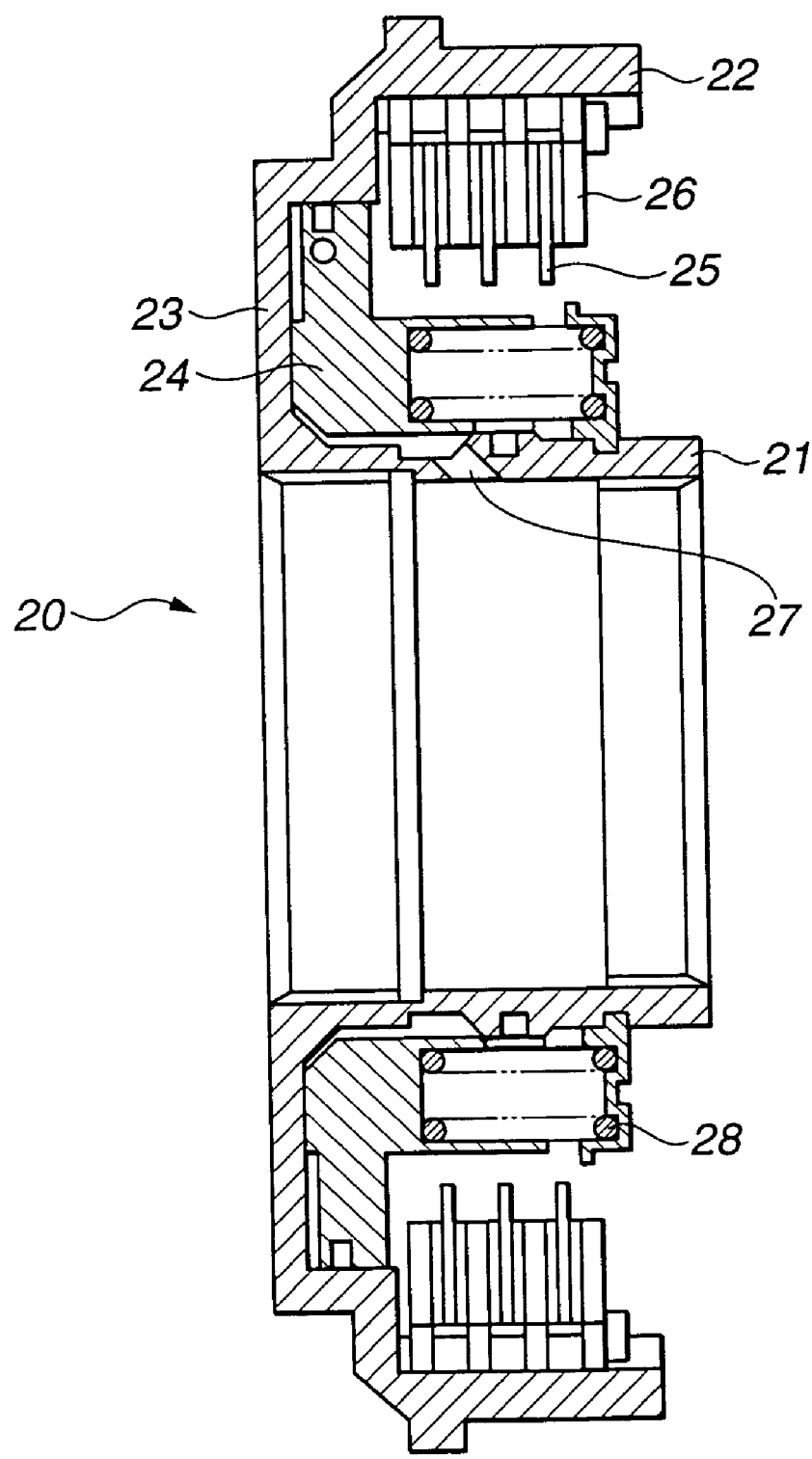
FIG. 2 is a side sectional view of a hydraulic clutch selectively engageable to establish a gear ratio in the automatic transmission of FIG. 1.

FIG. 2 is a side sectional view of a hydraulic clutch 20 selectively engageable to establish a gear ratio in the automatic transmission of FIG. 1. As shown in FIG. 2, hydraulic clutch 20 includes a clutch drum 23 including an inner tube 21, an outer tube 22, and a bottom portion, defining an annular space. In the annular space of clutch drum 23, there are mounted an annular clutch piston 24, a plurality of drive plates 25, and a plurality of driven plates 26. Slidably mounted in the axial direction (the horizontal direction of FIG. 2), drive plates 25 and driven plates 26 are disposed alternately.

Inner tube 21 of clutch drum 23 includes a through port 27. When high-pressured hydraulic fluid is supplied via port 27 into clutch drum 23, clutch piston 24 travels in the axial direction toward the open end portion of clutch drum 23 (to the right in FIG. 2). This linear movement of clutch piston 24 biases drive plates 25 and driven plates 26 toward each other, to establish torque transmission. Between inner tube 21 of clutch drum 23 and clutch piston 24 is mounted a clutch spring 28, to bias clutch piston 24 toward the bottom portion of clutch drum 23. When the hydraulic pressure falls, clutch piston 24 travels back to the bottom portion of clutch drum 23, biased by clutch spring 28.

Figure 3:
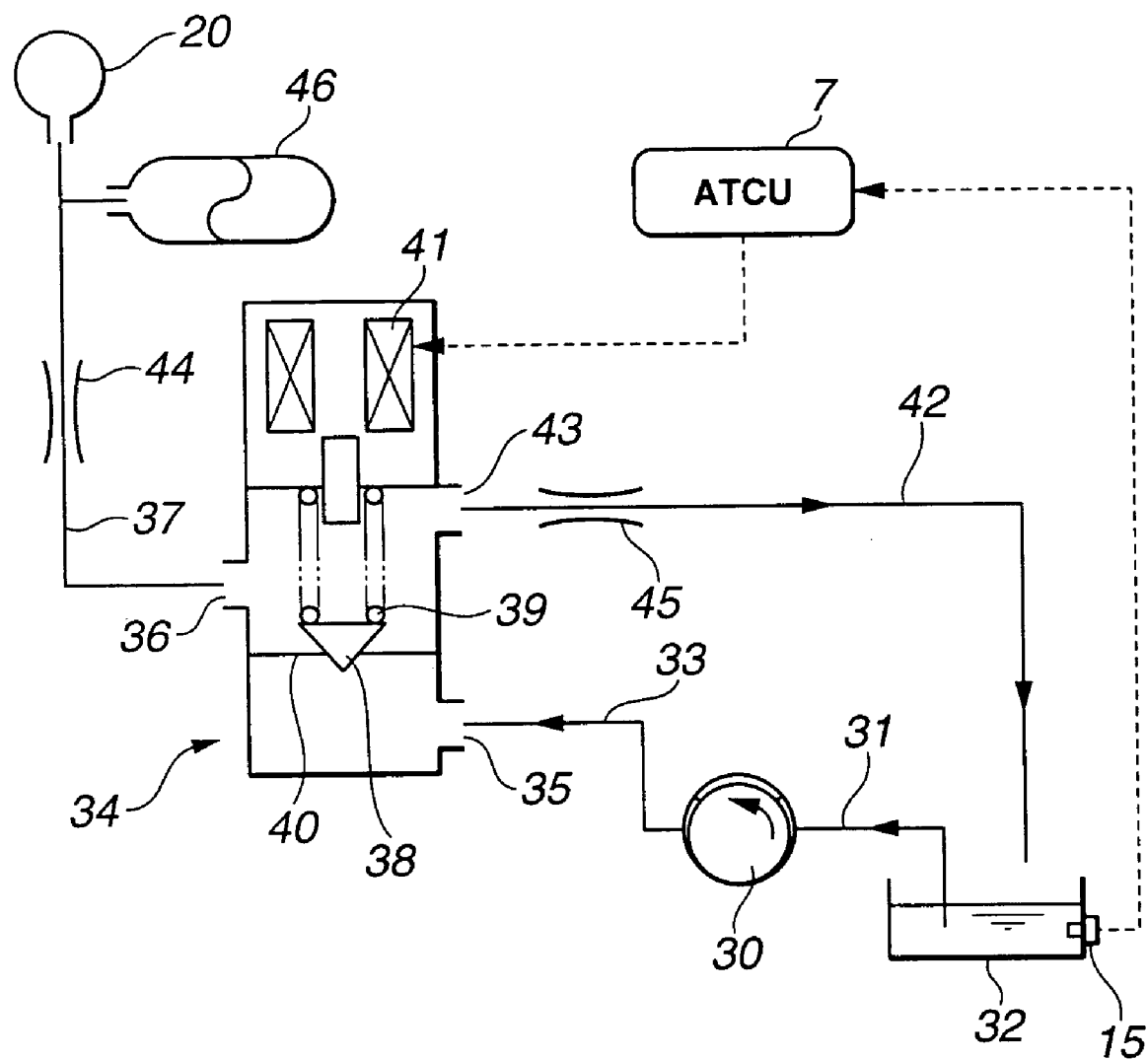
FIG. 3 is a schematic diagram depicting a hydraulic circuit to operate the hydraulic clutch of FIG. 2.

FIG. 3 is a schematic diagram depicting a hydraulic circuit to operate hydraulic clutch 20. As shown in FIG. 3, driven by the crankshaft of engine 1, a hydraulic pump 30 supplies a hydraulic pressure to engage hydraulic clutch 20. Hydraulic pump 30 draws by suction via an oil passage 31 the hydraulic fluid stored in an oil pan 32, to produce a hydraulic pressure in the hydraulic circuit. Hydraulic pump 30 is connected via an oil passage 33 to an inlet port 35 of a solenoid valve 34 as a hydraulic pressure control valve. The discharge pressure of hydraulic pump 30 is adjusted by a pressure regulating valve (not shown) to be a line pressure to be supplied to inlet port 35 of solenoid valve 34. Solenoid valve 34 includes a supply port 36 connected via an oil passage 37 to hydraulic clutch 20. Solenoid valve 34 includes a valve element 38 to connect inlet port 35 and supply port 36. With valve element 38 being lifted, the line pressure is supplied to hydraulic clutch 20.

Valve element 38 of solenoid valve 34 is constantly biased by a return spring 39 toward a valve seat 40. Driven by ATCU 7, solenoid 41 biases and pulls up valve element 38 to lift. ATCU 7 controls solenoid valve 34 by duty control at a predetermined frequency such as 50 Hz.

Solenoid valve 34 includes a drain port 43 in fluid communication with supply port 36, which is an oil passage 42 connected to oil pan 32. Orifices 44, 45 are provided in oil passages 37, and 42, respectively. The flow sectional area of orifice 44 is set to be larger than that of orifice 45. Between hydraulic clutch 20 and orifice 44 in oil passage 37 is disposed an accumulator 46.

The following describes an example of shift control operation of the shift control system in which clutch plates of hydraulic clutch 20 approach to each other to be engaged with each other to establish a gear ratio in case a selector lever is shifted from N range to D range. Receiving a command indicative of gear shift from an electrical control unit which determines whether or not a gear shift is needed in accordance with the engine speed and the engine load, and issues a command accordingly, ATCU 7 controls solenoid valve 34 by changing the duty ratio in accordance with a control program as discussed below.

Figure 4:
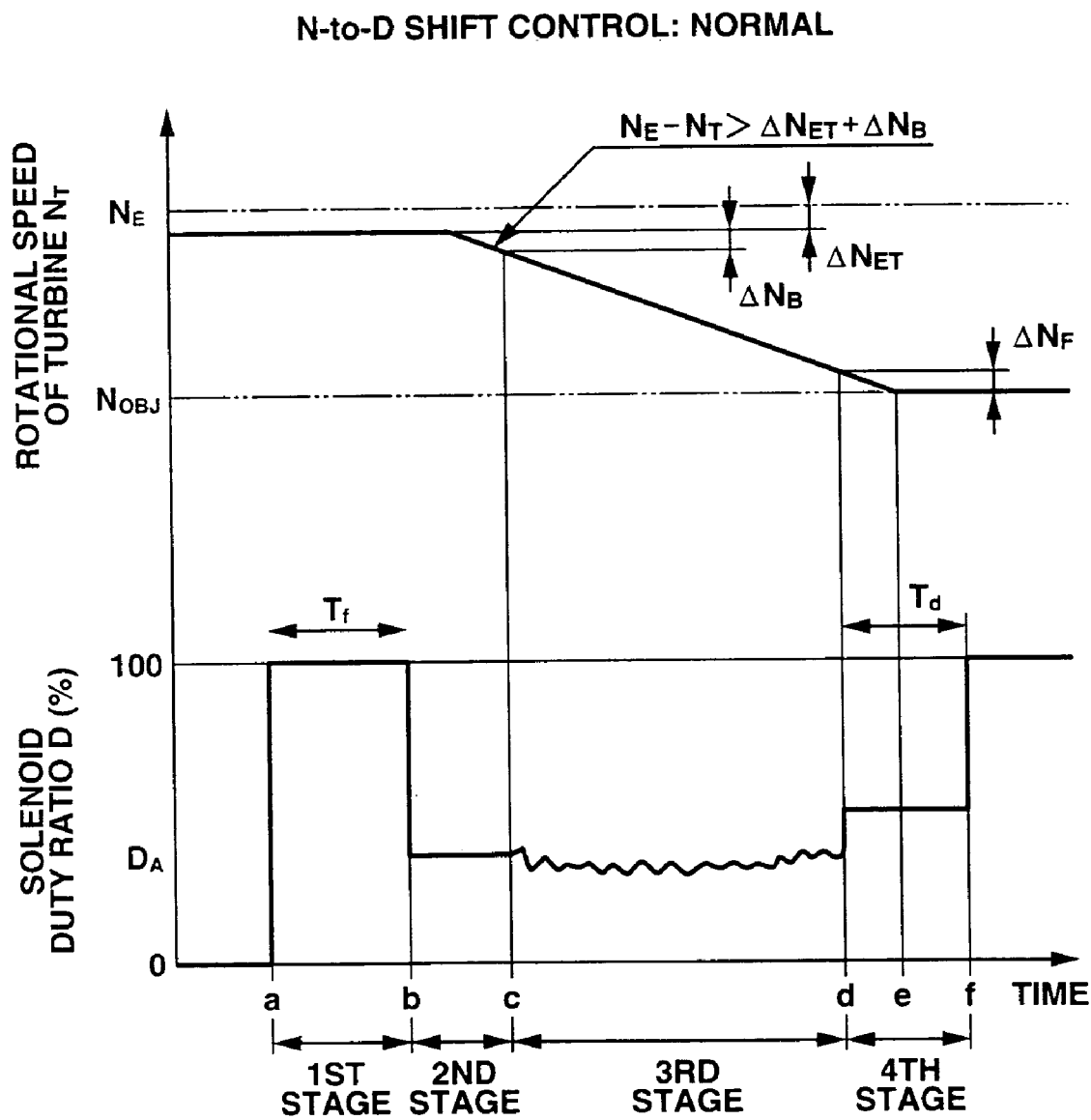
FIG. 4 is a time chart depicting a change in a turbine speed of a torque converter, and a change in a duty ratio at which a solenoid valve for adjusting a hydraulic pressure is operated, during a shift control process with engagement of the hydraulic clutch of FIG. 2 in a normal shift process from N range to D range.

FIG. 4 is a time chart depicting a change in turbine speed $N_T$ of torque converter 3, and a change in the duty ratio at which solenoid valve 34 is operated, during a shift control process with engagement of hydraulic clutch 20 in a normal shift process from N range to D range. As shown in FIG. 4, the control process includes the following four stages.

First, in the first stage (from time point a to time point b), ATCU 7 executes a clutch approach control operation in which clutch piston 24 is pressed toward clutch plates 25, 26 to travel freely to be in contact with clutch plates 25, 26. At time point a, a command indicative of shifting from N range to D range is issued. Immediately upon the occurrence of the issue of the command indicative of shifting to D range, the clutch approach control operation of clutch piston 24 is initiated. More specifically, solenoid valve 34 is operated at 100% duty ratio, to control the hydraulic pressure at a maximum hydraulic pressure to eliminate the free travel of clutch piston 24, during a time period Tf from time point a to time point b. Time point a, time point b, and time period Tf may be referred to as a clutch approach start time point, a clutch approach end time point, and a clutch approach time period, respectively. In the first stage, turbine speed $N_T$ is unchanged, because hydraulic clutch 20 remains disengaged. Clutch approach period Tf is calculated or retrieved from a predetermined data map as a function of the operating conditions such as the engine speed.

Next, in the second stage (from time point b to time point c, that is, from a time point when it is determined that the free travel of clutch piston 24 is eliminated, to a time point when it is determined that clutch plates 25, 26 start engaged to establish an actual torque transmission), solenoid valve 34 is operated at a constant duty ratio D. At time point b, on the start of an effective travel of hydraulic clutch 20 after a free travel of hydraulic clutch 20, duty ratio D is set to a predetermined early-stage duty ratio $D_A$. As in the case of clutch approach period Tf, early-stage duty ratio $D_A$ is calculated or retrieved from a predetermined data map as a function of the operating conditions such as the engine speed. Hydraulic clutch 20 starts engaged at a time point between time point b and time point c, by keeping operating solenoid valve 34 at early-stage duty ratio $D_A$.

With hydraulic clutch 20 engaged, torque transmission is established, to decrease turbine speed $N_T$. Accordingly, at time point c when turbine speed $N_T$ decreases to a predetermined rotational speed, ATCU 7 determines that the torque transmission is commenced. Actually, it is determined whether or not the difference ($=N_E-N_T$) between engine speed $N_E$ and transmission turbine speed $N_T$ is greater than or equal to the sum ($=\Delta N_B+\Delta N_{ET}$) of an initial speed difference $\Delta N_{ET}$ between engine speed $N_E$ and turbine speed $N_T$ and a predetermined threshold decrease $\Delta N_B$. When the answer is YES, the process proceeds to the third stage as discussed below, considering that the shift operation starts. Initial speed difference $\Delta N_{ET}$ is determined in accordance with engine speed $N_E$ and turbine speed $N_T$ at time point b, when the second stage of the shift control operation is commenced.

Next, in the third stage (from time point c to time point d), ATCU 7 controls solenoid valve 34 by adjusting duty ratio D by a feedback control so as to regulate the rate of change in turbine speed $N_T$ to a predetermined target rate of change. When the difference ($N_T-N_{OBJ}$) between turbine speed $N_T$ and a predetermined target speed $N_{OBJ}$ decreases to be smaller than or equal to a predetermined threshold speed $\Delta N_F$ (at time point d), this third stage is terminated. Thus, in the third stage, the clutch apply slippage rate is linearly or smoothly reduced.

Next, in the fourth stage (from time point d to time point f), solenoid valve 34 is operated at a constant duty ratio D. Duty ratio D is set to a predetermined constant rate during a predetermined wait time period Td from time point d to time point f. At the end of time period Td, that is, at time point f, duty ratio D is increased again to 100% based on the assumption that turbine speed $N_T$ is equal to target speed $N_{OBJ}$ at time point e between time point d and time point f, or that hydraulic clutch 20 is fully engaged. At time point f, an overall process of N-to-D shift control is terminated.

Figure 5:
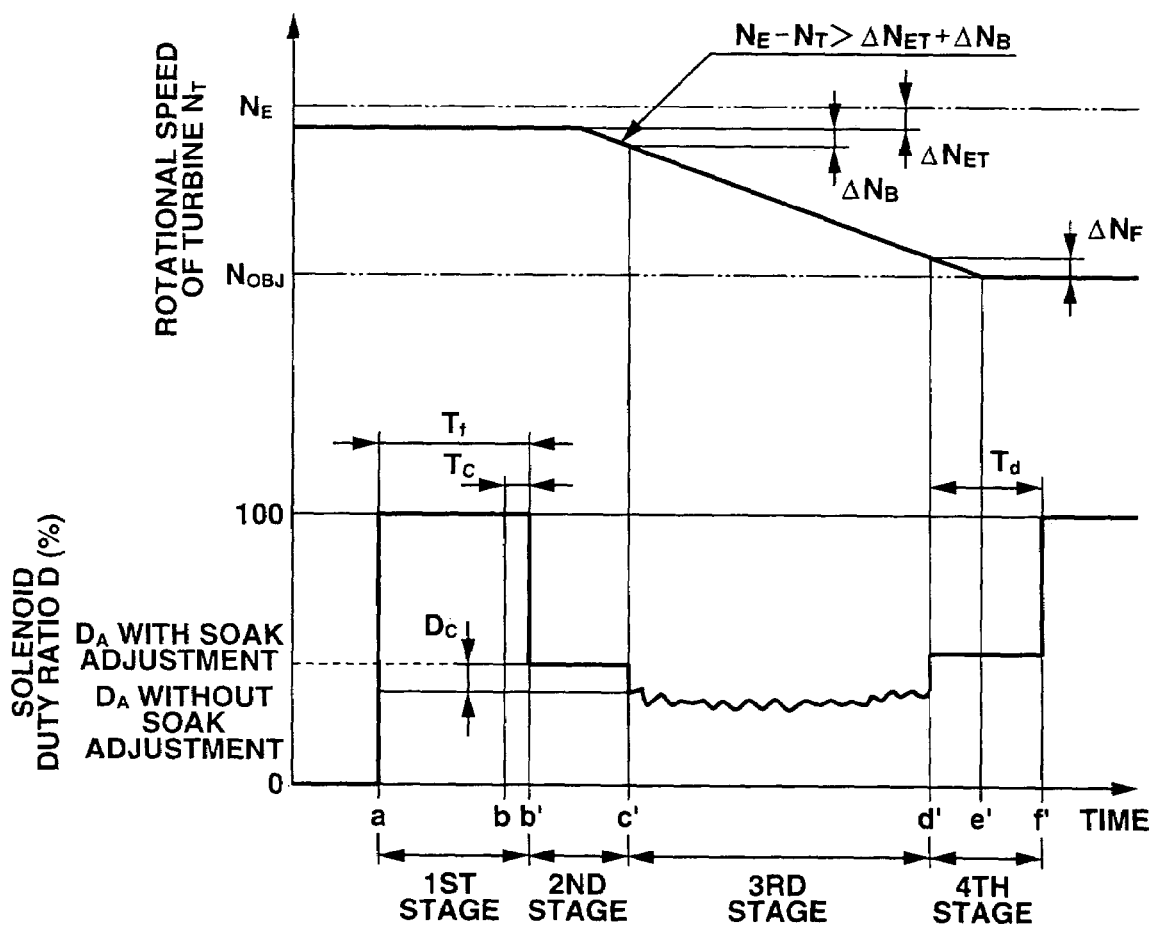
FIG. 5 is a time chart depicting a change in the turbine speed, and a change in the duty ratio, during a shift control process with engagement of the hydraulic clutch of FIG. 2 in a shift process from N range to D range with adjustment.

On the other hand, when a gear shift is requested just after an engine restart, ATCU 7 controls the hydraulic clutch with an adjusted shift control process, in contrast to a normal condition of the engine. ATCU 7 switches a control method of controlling the hydraulic pressure between a predetermined normal control method and a modified control method, in accordance with an operating condition of the powertrain such as a number of times of execution of engaging hydraulic clutch 20 after the engine restart. ATCU 7 then controls the hydraulic pressure in accordance with the modified control method, in case the number of times of execution is smaller than or equal to a predetermined threshold number. In the predetermined number of times of shift control just after engine restart after a period of soak, clutch approach period Tf and early-stage duty ratio $D_A$, as control variables characterizing the control method, are adjusted based on clutch approach period Tf and early-stage duty ratio DA in the normal condition (hereinafter referred to as a "soak adjustment" or a "soak correction"). FIG. 5 is a time chart depicting a change in turbine speed $N_T$, and a change in duty ratio D, during a shift control process with engagement of hydraulic clutch 20 in a shift process from N range to D range with soak adjustment. As shown in FIG. 5, the shift control process includes the following four stages.

First, in the first stage (from time point a to time point b'), ATCU 7 executes a clutch approach control operation in which clutch piston 24 is pressed toward clutch plates 25, 26 to travel freely to be in contact with clutch plates 25, 26. At time point a, a command indicative of shifting from N range to D range is issued. Immediately upon the occurrence of the issue of the command indicative of shifting to D range, the clutch approach control operation of clutch piston 24 is initiated. In contrast to the normal operating condition, clutch approach period Tf is produced by adding a clutch approach period adjustment $T_C$ (positive in general) to clutch approach period Tf of the normal N-to-D shift control. Solenoid valve 34 is operated at 100% duty ratio, during a time period Tf from time point a to time point b'. In the first stage, turbine speed $N_T$ is unchanged, because hydraulic clutch 20 remains disengaged.

Figure 6A:
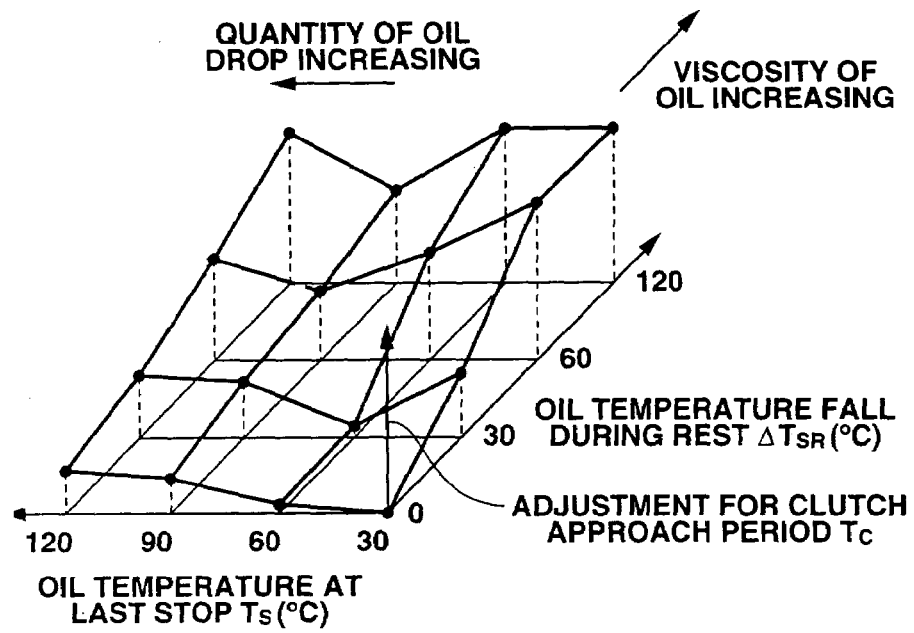
FIG. 6A is a data map for retrieving a clutch approach period adjustment $T_C$ used to adjust a clutch approach period Tf, in accordance with the embodiment of the present invention.

Clutch approach period adjustment $T_C$ is retrieved from a predetermined data map as shown in FIG. 6A. This data map is a three-dimensional data map having an axis of oil temperature $T_S$ at the last engine stop, and an axis of temperature drop $\Delta T_{SR}$. Oil temperature $T_S$ as a first oil temperature, and oil temperature $T_R$ as a second temperature are detected by oil temperature sensor 15, at a first time point when the engine is last stopped, and at a second time point when the engine restarted after a period of soak, respectively. Temperature drop $\Delta T_{SR}$ is the difference $(T_S-T_R)$ between oil temperature $T_S$ and oil temperature $T_R$.

The data map of FIG. 6A is predetermined by determining optimum values based on experiments and/or computational simulations. In the direction of the axis of temperature drop $\Delta T_{SR}$ in FIG. 6A, clutch approach period adjustment $T_C$ increases with temperature drop $\Delta T_{SR}$. This is consistent with the fact that temperature drop $\Delta T_{SR}$ is proportional to the time period of soak, and with the fact that the quantity of the hydraulic fluid in the chamber of clutch piston 24 which drops onto oil pan 32 increases with the time period of soak.

On the other hand, in the direction of the axis of oil temperature $T_S$, clutch approach period adjustment $T_C$ increases with oil temperature $T_S$ in a region in which temperature drop $\Delta T_{SR}$ is small. This is consistent with the fact that the quantity of the hydraulic fluid in the chamber of clutch piston 24 which drops onto oil pan 32 increases with oil temperature $T_S$. On the other hand, clutch approach period adjustment $T_C$ increases with decreasing oil temperature $T_S$ in part of a region in which temperature drop $\Delta T_{SR}$ is high. This is consistent with the fact that the viscosity of hydraulic fluid increases with decreasing oil temperature $T_R$ at the engine restart.

The viscosity of the hydraulic fluid decreases with increasing temperature of the hydraulic fluid, so that the quantity of the hydraulic fluid which drops from the chamber of clutch piston 24 to oil pan 32 increases. On the contrary, the viscosity of the hydraulic fluid increases with decreasing temperature of the hydraulic fluid, so that the quantity of the hydraulic fluid which drops from the chamber of clutch piston 24 to oil pan 32 decreases. Accordingly, clutch approach period Tf needed tends to increase with increasing temperature of the hydraulic fluid. On the other hand, a large increase in the viscosity of the hydraulic fluid in accordance with a large decrease in the temperature of the hydraulic fluid leads to a low responsiveness of the hydraulic fluid. Accordingly, clutch approach period Tf needed tends to increase with decreasing temperature of the hydraulic fluid. These two aspects of clutch approach period Tf are combined to be a complex map as shown in FIG. 6A. Thus, in the first stage, turbine speed $N_T$ remains constant, with hydraulic clutch 20 not engaged to establish a gear ratio.

Next, in the second stage (from time point b' to time point c', that is, from a time point when it is determined that the free travel of clutch piston 24 is eliminated, to a time point when it is determined that clutch plates 25, 26 start engaged to establish an actual torque transmission), solenoid valve 34 is operated at a constant duty ratio D. At time point b', duty ratio D is set to a predetermined early-stage duty ratio $D_A$ for soak adjustment. In contrast to the normal operating condition, early-stage duty ratio $D_A$ is produced by adding a duty ratio adjustment $D_C$ (positive in general) to early-stage duty ratio $D_A$ of the normal N-to-D shift control. Hydraulic clutch 20 starts engaged at a time point between time point b' and time point c', by keeping operating solenoid valve 34 at early-stage duty ratio $D_A$.

Figure 6B:
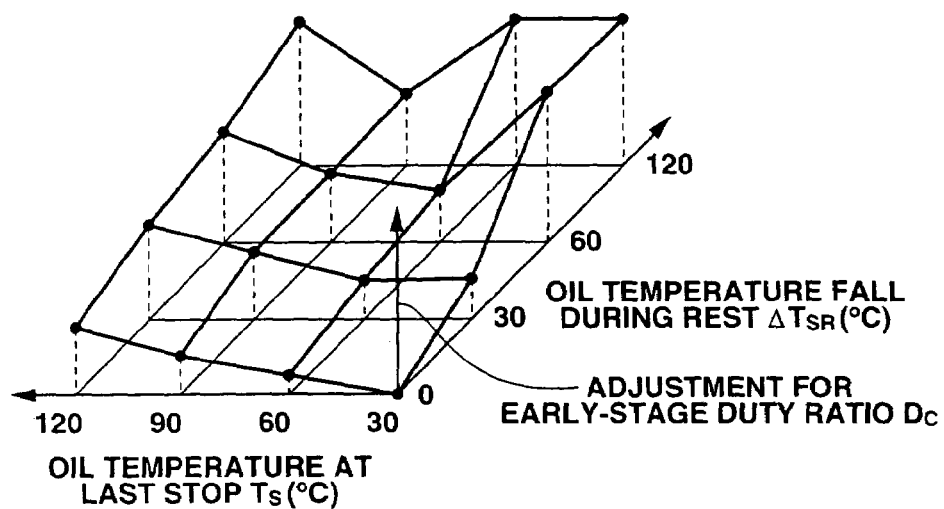
FIG. 6B is a data map for retrieving a duty ratio adjustment $D_C$ used to adjust an early-stage duty ratio $D_A$, in accordance with the embodiment of the present invention.

Duty ratio adjustment $D_C$ is retrieved from a predetermined data map as shown in FIG. 6B. This data map is a three-dimensional data map having an axis of oil temperature $T_S$ at the last engine stop, and an axis of temperature drop $\Delta T_{SR}$. Oil temperature $T_S$, and oil temperature $T_R$ are detected by oil temperature sensor 15, at a time point when the engine is last stopped, and at a time point when the engine restarted after a period of soak, respectively. Temperature drop $\Delta T_{SR}$ is the difference $(T_S-T_R)$ between oil temperature $T_S$ and oil temperature $T_R$.

The data map of FIG. 6B is predetermined by determining optimum values based on experiments and/or computational simulations. The data map of FIG. 6B has a similar tendency as the data map of FIG. 6A. In the direction of the axis of temperature drop $\Delta T_{SR}$ in FIG. 6B, duty ratio adjustment $D_C$ needed increases with temperature drop $\Delta T_{SR}$. This is consistent with the fact that temperature drop $\Delta T_{SR}$ is proportional to the time period of soak, and with the fact that the quantity of the hydraulic fluid in the chamber of clutch piston 24 which drops onto oil pan 32 increases with the time period of time soak.

On the other hand, in the direction of the axis of oil temperature $T_S$, duty ratio adjustment Dc increases with oil temperature $T_S$ in a region in which temperature drop $\Delta T_{SR}$ is small. This is consistent with the fact that the quantity of the hydraulic fluid in the chamber of clutch piston 24 which drops onto oil pan 32 increases with oil temperature $T_S$. On the other hand, duty ratio adjustment $D_C$ increases with decreasing oil temperature $T_S$ in part of a region in which temperature drop $\Delta T_{SR}$ is high. This is consistent with the fact that the viscosity of hydraulic fluid increases with decreasing oil temperature $T_R$ at the engine restart. These aspects of the map are consistent with a similar fact as in FIG. 6B.

With hydraulic clutch 20 engaged, torque transmission is established, to decrease turbine speed $N_T$. Accordingly, at time point c' when turbine speed $N_T$ decreases to a predetermined rotational speed, ATCU 7 determines that the torque transmission is commenced. Actually, it is determined whether or not the difference $(=N_E-N_T)$ between engine speed $N_E$ and transmission turbine speed $N_T$ is greater than or equal to the sum $(=\Delta N_B+\Delta N_{ET})$ of an initial speed difference $\Delta N_{ET}$ between engine speed $N_E$ and turbine speed $N_T$ and a predetermined threshold decrease $\Delta N_B$. When the answer is YES, the process proceeds to the third stage as discussed below, considering that the shift operation starts. Initial speed difference $\Delta N_{ET}$ is determined in accordance with engine speed $N_E$ and turbine speed $N_T$ at time point b', when the second stage of the shift control operation is commenced. However, the adjusted early-stage duty ratio $D_A$ is too large for torque transmission in the following third stage. Therefore, the third stage employs a decreased early-stage duty ratio $D_A$ (same as in the normal N-to-D shift control), which is produced by subtracting duty ratio adjustment $D_C$ from early-stage duty ratio $D_A$ for the second stage.

Next, in the third stage (from time point c' to time point d'), ATCU 7 controls solenoid valve 34 by adjusting duty ratio D by a feedback control so as to regulate the rate of change in turbine speed $N_T$ to a predetermined target rate of change. When the difference $(N_T-N_{OBJ})$ between turbine speed $N_T$ and a predetermined target speed $N_{OBJ}$ decreases to be smaller than or equal to a predetermined threshold speed $\Delta N_F$ (at time point d'), this third stage is terminated.

Thus, in the third stage, the clutch apply slippage rate is linearly or smoothly reduced.

Next, in the fourth stage (from time point d' to time point f'), solenoid valve 34 is operated at a constant duty ratio D. Duty ratio D is set to a predetermined constant rate during a predetermined wait time period Td from time point d' to time point f'. At the end of time period Td, that is, at time point f', duty ratio D is increased again to 100% based on the assumption that turbine speed $N_T$ is equal to target speed $N_{OBJ}$ at time point e' between time point d' and time point f', or that hydraulic clutch 20 is fully engaged. At time point f', an overall process of N-to-D shift control is terminated.

The following describes operations of the shift control system as discussed above. FIGS. 7 through 10 show a flow chart (N-to-D shift control subroutine) in which when the selector lever is shifted from N range to D range, ATCU 7 (in cooperation with ECU 6) executes a corresponding shift control including an operation of engaging the clutch plates of hydraulic clutch 20. The flow chart of FIGS. 7 through 10 is repeatedly executed by ATCU 7 until engagement of hydraulic clutch 20 is completed.

In FIGS. 7 through 10, C represents a control flag. C=0 indicates an operating condition in which the shift control routine is not initiated (an operating condition before or after the sift control operation). C=1 indicates an operating condition in which the routine proceeds in the first stage. C=2 indicates an operating condition in which the routine proceeds in the second stage. C=3 indicates an operating condition in which the routine proceeds in the third stage. C=4 indicates an operating condition in which the routine proceeds in the fourth stage. Control flag C is initially reset to 0.

When the selector lever is shifted from N range to D range, a command indicative of shift control is issued in ATCU 7 (at time point a). On the issue of the shift control command, the N-to-D shift control subroutine is executed. As shown in FIG. 7, first, at step S10, ATCU 7 reads input information from sensors and ECU 6 into RAM. Next, at step S20, ATCU 7 makes a check to determine whether or not control flag C is 0, that is, whether or not the routine is before the first stage. In case the subroutine is first executed after the gear being shifted from N range to D range, control flag C is 0. When the answer to step S20 is YES, the routine proceeds to step S30. When the answer to step S20 is NO, the routine proceeds to a routine in FIG. 8. At step S30, ATCU 7 reads clutch approach period Tf and early-stage duty ratio $D_A$ from the data map. Next, at step S40, early-stage duty ratio $D_{A3}$ for the third stage is set to early-stage duty ratio $D_A$.

Next, at step S50, ATCU 7 makes a check to determine whether or not hydraulic clutch 20 is first operated after the engine restart. When the answer to step S50 is YES, the routine proceeds to step S60. In case of the first execution of the shift control subroutine, the routine proceeds to step S60. At step S60, ATCU 7 determines clutch approach period adjustment $T_C$ and duty ratio adjustment $D_C$, based on the data maps of FIGS. 6A and 6B as functions of oil temperature $T_S$ and temperature drop $\Delta T_{SR}$.

Next, at step S70, ATCU 7 adjusts clutch approach period Tf by adding clutch approach period adjustment $T_C$, and early-stage duty ratio $D_A$ by adding duty ratio adjustment $D_C$. Next, at step S80, ATCU 7 sets control flag C to 1, to start the first stage of the shift control process, in which solenoid valve 34 is fully opened at 100% duty ratio during clutch approach period Tf.

On the other hand, when the answer to step S50 is NO, the routine proceeds to step S80, skipping steps S60 and S70. That is, in case hydraulic clutch 20 is operated for a second time or more after the engine restart, the adjustment process is not executed. Next, at step S80, ATCU 7 sets control flag C to 1, to start the first stage of the shift control process.

Figure 8:
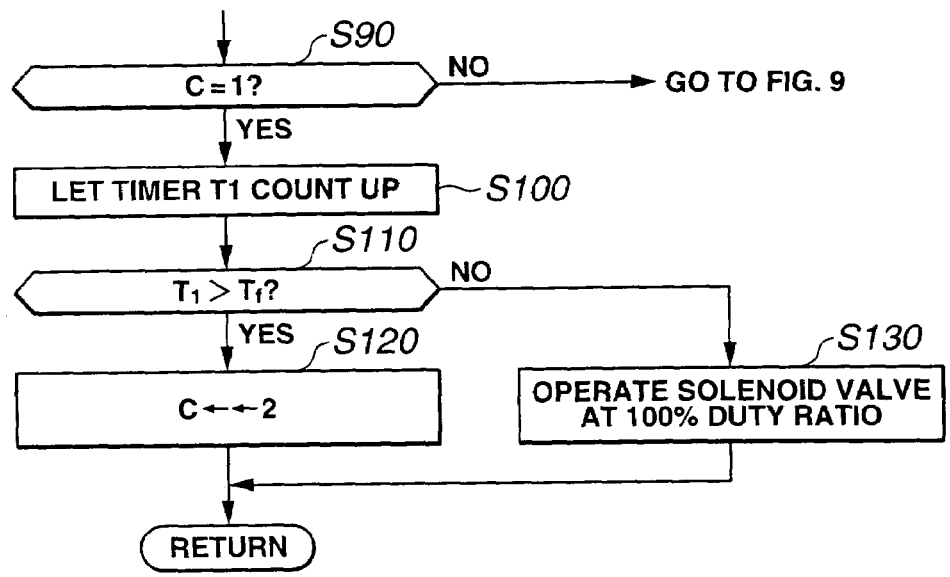
FIG. 8 is a flow chart depicting a second part of the N-to-D shift control subroutine, which follows the first part of the subroutine of FIG. 7.
Figure 9:
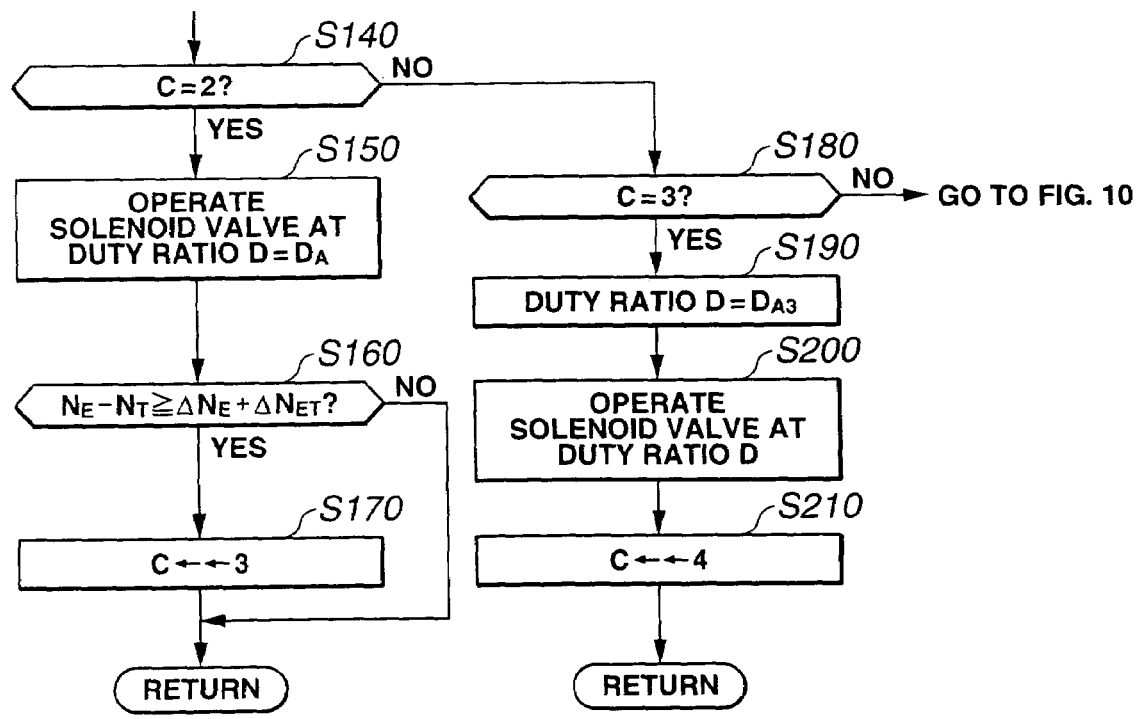
FIG. 9 is a flow chart depicting a third part of the N-to-D shift control subroutine, which follows the second part of the subroutine of FIG. 8.

In the next execution of the shift control subroutine, control flag C is 1. Accordingly, the routine proceeds to steps S10, S20, and step S90 as shown in FIG. 8. At step S90, ATCU 7 makes a check to determine whether or not control flag C is 1, that is, whether or not the routine proceeds in the first stage. When the answer to step S90 is YES, the routine proceeds to step S100. On the other hand, when the answer to step S90 is NO, the routine proceeds to step S140 as shown in FIG. 9. Because control flag C is 1 in the second execution of the shift control subroutine, the routine proceeds to step S100. At step S100, ATCU 7 lets timer T1 to count. Next, at step S110, ATCU 7 makes a check to determine whether or not timer T1 is greater than clutch approach period Tf. When the answer to step S110 is YES, the routine proceeds to step S120. On the other hand, when the answer to step S110 is NO, the routine proceeds to step S130. Thus, at step S130, ATCU 7 keeps operating solenoid valve 34 at 100% duty ratio until clutch approach period Tf is elapsed.

When timer T1 exceeds clutch approach period Tf, ATCU 7 sets control flag C to 2 for entering the second stage, at step S120.

In the next execution of the shift control subroutine, control flag C is 2. Accordingly, the routine proceeds to steps S10, S20, S90, and step S140 as shown in FIG. 9. At step S140, ATCU 7 makes a check to determine whether or not control flag C is 2, that is, whether or not the routine proceeds in the second stage. When the answer to step S140 is YES, the routine proceeds to step S150. On the other hand, when the answer to step S140 is NO, the routine proceeds to step S180. Because control flag C is 2 in the current process, the routine proceeds to step S150, at which ATCU 7 operates solenoid valve 34 at early-stage duty ratio $D_A$.

Next, at step S160, ATCU 7 makes a check to determine whether or not the difference ($=N_E-N_T$) between engine speed $N_E$ and turbine speed $N_T$ is greater than or equal to the sum ($=\Delta N_B+\Delta N_{ET}$) of an initial speed difference $\Delta N_{ET}$ between engine speed $N_E$ and turbine speed $N_T$ and a predetermined threshold decrease $\Delta N_B$. When the answer to step S160 is YES, the routine returns. When the answer to step S160 is NO, the routine proceeds to step S170. Thus, ATCU 7 keeps operating solenoid valve 34 at early-stage duty ratio $D_A$ until the difference ($=N_E-N_T$) between engine speed $N_E$ and turbine speed $N_T$ becomes greater than or equal to the sum ($=\Delta N_B+\Delta N_{ET}$) of an initial speed difference $\Delta N_{ET}$ between engine speed $N_E$ and turbine speed $N_T$ and a predetermined threshold decrease $\Delta N_B$.

When the condition of step S160 is satisfied, control flag C is set to 3 for entering the third stage, at step S170. Next, the routine returns.

Figure 10:
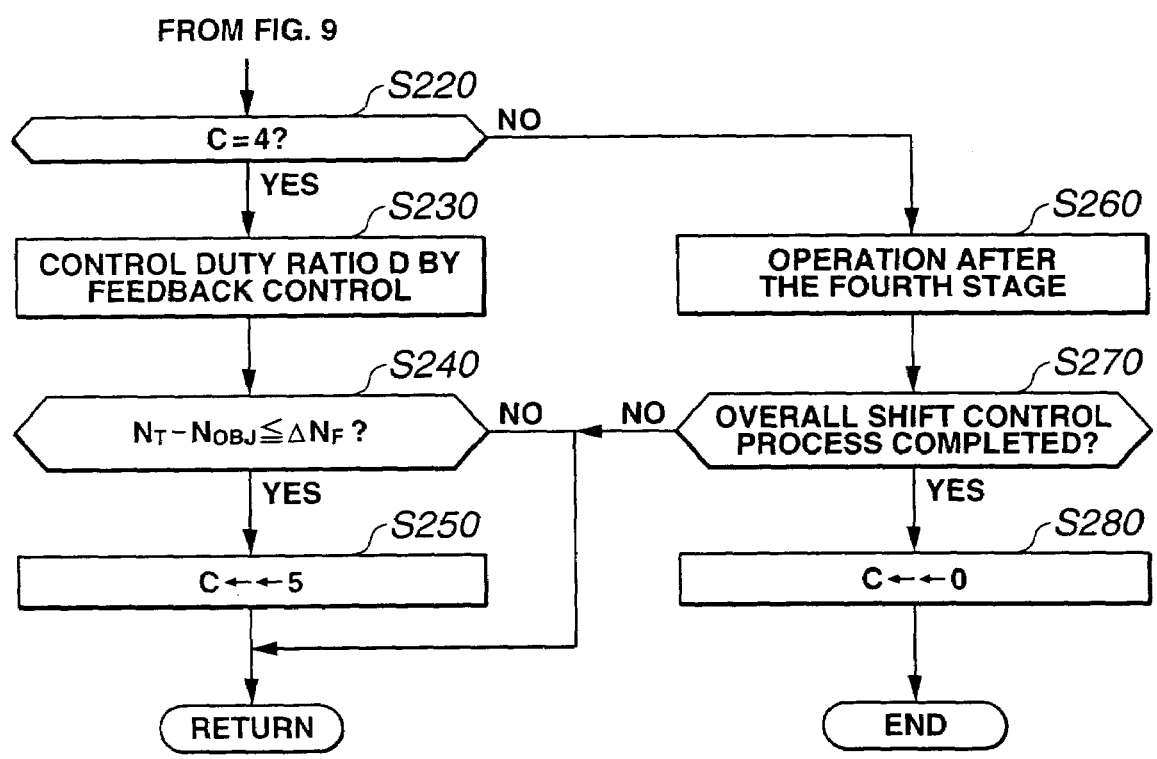
FIG. 10 is a flow chart depicting a fourth part of the N-to-D shift control subroutine, which follows the third part of the subroutine of FIG. 9.

In the next execution of the shift control subroutine, control flag C is 3. Accordingly, the routine proceeds to steps S10, S20, S90, S140, and step S180 as shown in FIG. 9. At step S190, ATCU 7 makes a check to determine whether or not control flag C is 3, that is, whether or not the routine proceeds in the third stage. When the answer to step S190 is YES, the routine proceeds to step S190. On the other hand, when the answer to step S190 is NO, the routine proceeds to step S220 as shown in FIG. 10. When the routine first executes step S180, the routine next proceeds to step S190, with control flag C being 3. At step S190, ATCU 7 sets duty ratio D to early-stage duty ratio $D_{A3}$ determined through step S40. Duty ratio D is set to a small early-stage duty ratio $D_{A3}$ in this manner because adjusted early-stage duty ratio $D_A$ is large to excessively increase the hydraulic pressure after turbine speed $N_T$ starting to change.

Next, at step S200, ATCU 7 operates solenoid valve 34 at duty ratio D. Next, at step S210, control flag C is set to 4. Next, the routine returns and proceeds to the fourth stage.

In the next execution of the shift control subroutine, control flag C is 4. Accordingly, the routine proceeds to steps S10, S20, S90, S140, S180, and step S220 as shown in FIG. 10. At step S220, ATCU 7 makes a check to determine whether or not control flag C is 4, that is, whether or not the routine proceeds in the fourth stage. When the answer to step S220 is YES, the routine proceeds to step S230. On the other hand, when the answer to step S220 is NO, the routine proceeds to step S260. When step S220 is first executed, the routine next proceeds to step S230, with control flag C being 4. At step S230, ATCU 7 controls solenoid valve 34 by adjusting duty ratio D by a feedback control so as to regulate the rate of change in turbine speed $N_T$ to a predetermined target rate of change.

Next, at step S240, ATCU 7 makes a check to determine whether or not the difference $(N_T-N_{OBJ})$ between turbine speed $N_T$ and a predetermined target speed $N_{OBJ}$ decreases to be smaller than or equal to a predetermined threshold speed $\Delta N_F$. When the answer to step S240 is YES, the routine proceeds to step S250. On the other hand, when the answer to step S240 is NO, the routine returns. At step S250, control flag C is set to 5, so that the routine proceeds to a steady-state process in which duty ratio D is kept as in the fourth stage. Thus, this process is repeatedly executed with control flag C being 4 until the difference $(N_T-N_{OBJ})$ between turbine speed $N_T$ and target speed $N_{OBJ}$ decreases to be smaller than or equal to threshold speed $\Delta N_F$.

In the next execution of the shift control subroutine, control flag C is 5. Accordingly, the routine proceeds to steps S10, S20, S90, S140, S180, S220, and step S260 as shown in FIG. 10. At step S260, ATCU 7 keeps duty ratio D as in the fourth stage. Duty ratio D is set to a predetermined constant rate during a predetermined wait time period Td. At the end of time period Td, that is, at time point e, duty ratio D is set to 100% again based on the assumption that turbine speed $N_T$ is equal to target speed $N_{OBJ}$ with hydraulic clutch 20 fully engaged. At step S270, ATCU 7 makes a check to determine whether or not the shift control sequence is completed, that is, whether or not time period Td is elapsed with duty ratio D kept constant. Time period Td is predetermined so that the shift control sequence may be assumed to be completed. When the answer to step S270 is YES, the routine proceeds to step S280. On the other hand, when the answer to step S270 is NO, the routine returns. At step S280, control flag C is reset to 0. Next, the overall process of the shift control subroutine is terminated.

Preferably, after the third stage in which it is determined the clutch is engaged, duty ratio D may be slightly increased. Increasing duty ratio D to 100% at the end of the third stage may cause a shift shock. Therefore, duty ratio D is increased to 100% after time period Td, preventing a shift shock by a change in engine torque. Duty ratio D is adjusted by adding a predetermined adjustment, such as 10%.

In the shown embodiment, clutch approach period Tf and early-stage duty ratio $D_A$ are adjusted in accordance with the oil temperature at the last engine stop, the oil temperature at the engine restart, in addition to the engine soak period. Accordingly, the hydraulic pressure is properly adjusted at the engine restart, because the quantity of the hydraulic fluid which drops in accordance with the temperature of the hydraulic fluid is properly estimated. This certainly reduces a shift shock in the automatic transmission just after the engine restart.

In addition, clutch approach period Tf and early-stage duty ratio $D_A$ are adjusted in consideration of the decrease in the responsiveness of the hydraulic fluid which is caused by the increase in the viscosity of the hydraulic fluid with decreasing temperature of the hydraulic fluid, resulting in a proper adjustment of hydraulic pressure. This certainly reduces a shift shock in the automatic transmission just after the engine restart.

The shift control system as discussed above may be modified, as follows. In the shown embodiment, clutch approach period adjustment $T_C$ and duty ratio adjustment $D_C$ are used to adjust the shift control operation for adjustment for the engine soak period. Alternatively, the line pressure and/or the accumulator back pressure may be controlled to perform a smooth shift operation of the automatic transmission. In such a case, first, oil temperature $T_S$ at the last engine stop and oil temperature $T_R$ at the engine restart are detected. An adjustment value for the line pressure or the accumulator back pressure is retrieved from a predetermined data map as a function of oil temperature $T_S$ and temperature drop $\Delta T_{SR}$ $(T_S-T_R)$. The line pressure or the accumulator back pressure may be adjusted when the target frictional engaging element is operated for gear shift for a first time after the engine restart.

This application is based on a prior Japanese Patent Application No. 2004-91752 filed on Mar. 26, 2004. The entire contents of this Japanese Patent Application No. 2004-91752 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift control system for an automatic transmission for a vehicle, the automatic transmission including a frictional engaging element selectively engageable to establish a gear ratio, and a hydraulic pump to supply a hydraulic pressure to engage the frictional engaging element, the shift control system comprising:
  an oil temperature sensor to measure an oil temperature of hydraulic fluid flowing within the automatic transmission;
  a hydraulic controller to regulate the hydraulic pressure; and
  a control unit in operative communication with the oil temperature sensor and the hydraulic controller, to perform the following:
    determining a first oil temperature at a first time point when an engine of the vehicle is last stopped;
    determining a second oil temperature at a second time point when the engine is last restarted after the first time point; and
    controlling the hydraulic pressure to engage the frictional engaging element, in accordance with the first oil temperature and a temperature difference between the first oil temperature and the second oil temperature.

2. The shift control system as claimed in claim 1, wherein the control unit is configured to perform the following:
    determining an operating condition of the engine;

switching in accordance with the operating condition a control method of controlling the hydraulic pressure between a predetermined normal control method and a control method modified in accordance with the first oil temperature and the temperature difference between the first oil temperature and the second oil temperature; and controlling the hydraulic pressure in accordance with a selected one of the control methods.

3. The shift control system as claimed in claim 2, wherein the control unit is configured to perform the following:

determining an adjustment to be added to a control variable characterizing the control method, in accordance with the first oil temperature and the temperature difference between the first oil temperature and the second oil temperature; and adding the adjustment to the control variable in the normal control method to produce the control variable in the modified control method.

4. The shift control system as claimed in claim 2, further comprising an accumulator to regulate the hydraulic pressure for the frictional engaging element, wherein the control unit is configured to perform the following:

determining an adjustment to be added to a back pressure on the accumulator, in accordance with the first oil temperature and the temperature difference between the first oil temperature and the second oil temperature; and adding the adjustment to the back pressure in the normal control method to produce the back pressure in the modified control method.

5. The shift control system as claimed in claim 2, wherein the control unit is configured to perform the following:

controlling the hydraulic pressure at a maximum hydraulic pressure to eliminate a free travel of the frictional engaging element during a predetermined time period, in accordance with the normal control method;

determining an adjustment to be added to the predetermined time period, in accordance with the first oil temperature and the temperature difference between the first oil temperature and the second oil temperature; and adding the adjustment to the predetermined time period in the normal control method to produce the predetermined time period in the modified control method.

6. The shift control system as claimed in claim 2, wherein the control unit is configured to perform the following:

determining a number of times of execution of engaging the frictional engaging element after the second time point; and controlling the hydraulic pressure in accordance with the modified control method, in case the number of times of execution is smaller than or equal to a predetermined threshold number.

7. The shift control system as claimed in claim 2, wherein the control unit is configured to perform the following:

controlling the hydraulic pressure at a maximum hydraulic pressure during a predetermined time period, in accordance with the normal control method;

determining an adjustment to be added to the predetermined time period, in accordance with the first oil temperature and the temperature difference between the first oil temperature and the second oil temperature; and adding the adjustment to the predetermined time period in the normal control method to produce the predetermined time period in the modified control method.

8. The shift control system as claimed in claim 7, wherein the adjustment for the predetermined time period is positive.

9. The shift control system as claimed in claim 2, wherein the control unit is configured to perform the following:

controlling the hydraulic pressure at a predetermined hydraulic pressure on the start of an effective travel of the frictional engaging element after a free travel of the frictional engaging element, in accordance with the normal control method;

determining an adjustment to be added to the predetermined hydraulic pressure, in accordance with the first oil temperature and the temperature difference between the first oil temperature and the second oil temperature; and adding the adjustment to the predetermined hydraulic pressure in the normal control method to produce the predetermined hydraulic pressure in the modified control method.

10. The shift control system as claimed in claim 9, wherein the adjustment for the predetermined hydraulic pressure is positive.

11. A shift control system for an automatic transmission for a vehicle, the automatic transmission including a frictional engaging element selectively engageable to establish a gear ratio, and a hydraulic pump to supply a hydraulic pressure to engage the frictional engaging element, the shift control system comprising:

oil temperature sensing means for measuring an oil temperature of hydraulic fluid flowing within the automatic transmission;

hydraulic controlling means for regulating the hydraulic pressure; and control means in operative communication with the oil temperature sensing means and the hydraulic controlling means, for performing the following:

determining a first oil temperature at a first time point when an engine of the vehicle is last stopped;

determining a second oil temperature at a second time point when the engine is last restarted after the first time point; and controlling the hydraulic pressure to engage the frictional engaging element, in accordance with the first oil temperature and a temperature difference between the first oil temperature and the second oil temperature.

12. A method of controlling a shift control system for an automatic transmission for a vehicle, the automatic transmission including a frictional engaging element selectively engageable to establish a gear ratio, and a hydraulic pump to supply a hydraulic pressure to engage the frictional engaging element, the method comprising:

determining a first oil temperature at a first time point when an engine of the vehicle is last stopped;

determining a second oil temperature at a second time point when the engine is last restarted after the first time point; and controlling the hydraulic pressure to engage the frictional engaging element, in accordance with the first oil temperature and a temperature difference between the first oil temperature and the second oil temperature.

* * * * *